United States Patent
Agrawal et al.

(10) Patent No.: US 9,720,724 B2
(45) Date of Patent: *Aug. 1, 2017

(54) SYSTEM AND METHOD FOR ASSISTING VIRTUAL MACHINE INSTANTIATION AND MIGRATION

(71) Applicant: INTERNATIONAL BUSINESS MACHINES CORPORATION, Armonk, NY (US)

(72) Inventors: Dakshi Agrawal, Monsey, NY (US); Vasileios Pappas, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/052,168

(22) Filed: Feb. 24, 2016

(65) Prior Publication Data
US 2016/0170796 A1    Jun. 16, 2016

Related U.S. Application Data

(63) Continuation of application No. 14/812,752, filed on Jul. 29, 2015, now Pat. No. 9,300,725, which is a continuation of application No. 12/718,489, filed on Mar. 5, 2010, now Pat. No. 9,130,912.

(51) Int. Cl.
G06F 9/455    (2006.01)
H04L 29/08    (2006.01)
H04L 29/06    (2006.01)

(52) U.S. Cl.
CPC ......... *G06F 9/45558* (2013.01); *H04L 67/06* (2013.01); *H04L 67/10* (2013.01); *H04L 67/34* (2013.01); *H04L 69/14* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,415,704 B2 | 8/2008 | Schmidt et al. |
| 2008/0172448 A1 | 7/2008 | Wonus |
| 2008/0281884 A1 | 11/2008 | Subrahmanyam |
| 2009/0164660 A1 | 6/2009 | Abrams |
| 2009/0204718 A1 | 8/2009 | Lawton et al. |
| 2009/0210875 A1 | 8/2009 | Bolles et al. |
| 2009/0228589 A1 | 9/2009 | Korupolu |

(Continued)

OTHER PUBLICATIONS

Byers, J., et al. "Accessing Multiple Mirror Sites in Parallel: Using Tornado Codes to Speed up Downloads" Proceedings IEEE INFOCOM '99. Mar. 1999. pp. 275-284.

(Continued)

*Primary Examiner* — Gregory A Kessler
(74) *Attorney, Agent, or Firm* — Tutunjian & Bitetto, P.C.; Rabin Bhattacharya

(57) ABSTRACT

A system and method for instantiation of a virtual machine (VM) in a datacenter includes providing a network appliance in a location for listening to management information traffic. Indices are created for data center images in the network appliance. VM instantiation requests are intercepted in the network appliance. Locations from which blocks for the VM should be fetched based upon network cost are determined. VM image blocks are populated from the locations.

19 Claims, 3 Drawing Sheets

(56) References Cited

U.S. PATENT DOCUMENTS

2009/0276771 A1    11/2009   Nickolov et al.
2009/0313620 A1    12/2009   Sedukhin et al.
2010/0050172 A1    2/2010   Ferris

OTHER PUBLICATIONS

Rabin, M. "Efficient Dispersal of Information for Security, Load Balancing and Fault Tolerance" Journal of the ACM, vol. 36, No. 2. Apr. 1989. pp. 335-348.

Rodriguez, P., et al. "Parallel-Access for Mirror Sites in the Internet" Proceedings IEEE INFOCOM 2000. Mar. 2000. pp. 864-873.

Wikipedia. "Bit Torrent" http://web.archive.org/web/20100210203008/http://de.wikipedia.org/wiki/BitTorrent, Nov. 2012. (17 Pages).

International Search Report and Written Opinion for corresponding International Patent Application No. PCT/US11/23347. Dated: Mar. 29, 2011. (19 Pages).

Nath, P., et al. "Design Tradeoffs in Applying Cotent Addressable Storage to Enterprise-Scale Systems Based on Virtual Machines" Proceedings of the 2006 USENIX Annual Technical Conference (USENIX '06). May-Jun. 2006. (14 Pages).

SYSTEM AND METHOD FOR ASSISTING VIRTUAL MACHINE INSTANTIATION AND MIGRATION

BACKGROUND

Technical Field

The present invention relates to object instantiation and migration in a network environment, and more particularly to systems and methods for improved instantiation and migration of objects including virtual machines.

Description of the Related Art

In a cloud computing environment virtual machines (VMs) are instantiated on demand based on client needs. For management and scalability reasons, the instantiation of VMs usually happens over a datacenter network. In a typical scenario, a client selects a preconfigured VM image (created either by the client or another person) and requests the instantiation of the VM (or multiple VMs) based on that image. Instantiating the VM image requires transferring all the contents of the image over the network from an image library server to a hypervisor that is going to host the VM. In different implementations, it is possible to transfer on-demand the contents of the image that are needed for a given computation task. In addition, for reasons related to the optimization of the cloud infrastructure, VMs may dynamically migrate from one hypervisor to another over the datacenter network.

If VM instantiation and migration happen in high frequency (as it is expected in a cloud computing environment), they can lead to considerable consumption of network resources. The exhaustion of networking resources can result in a bottleneck which will prevent realization of the full potential of cloud computing since the current solutions to this problem either: 1) try to minimize the VM migrations to those that are absolutely necessary (only after hardware/hypervisor failures), which unfortunately limits the potential of the cloud infrastructure to deal with very dynamic loads; 2) try to deploy the image library servers closer to the host servers (hypervisors), which comes at the cost of either replicating the image library contents to multiple locations or limiting the deployment of specific images to specific locations (e.g., in the Amazon cloud, the image deployment is limited to regions); and 3) try to limit the maximum number of network resources used by the VM instantiation and migration processes (by rate limiting their traffic), which results in longer instantiation or migration times, again limiting the agility of the cloud environment.

SUMMARY

A system and method for transferring an object O from a source host A to a target host B includes dividing the object O into multiple blocks and discovering hosts populated with objects, including hosts A and B, and dividing those objects into multiple blocks. The hosts that have one or more of the blocks of object O are discovered, and the object O is constructed on host B by fetching each block of O from those hosts that have the blocks while minimizing a cost function in fetching each block of O.

A system and method for instantiation of a virtual machine (VM) in a datacenter includes providing a network appliance in a location for listening to management information traffic. Indices are created for data center images in the network appliance. VM instantiation requests are intercepted in the network appliance. Locations from which blocks for the VM should be fetched based upon network cost are determined. VM image blocks are populated from the locations.

A system for virtual machine (VM) transfer includes a network infrastructure including a plurality of interconnected nodes having processing elements. One or more network appliances are placed in the network infrastructure and configured to listen for VM management related traffic in the network infrastructure. The one or more network appliances are further configured to create an index of VM objects to track the VM objects within the network infrastructure. The one or more network appliances are configured to intercept VM transfer related traffic and download requested VM objects from closest sources to permit VM object transfer within the network infrastructure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
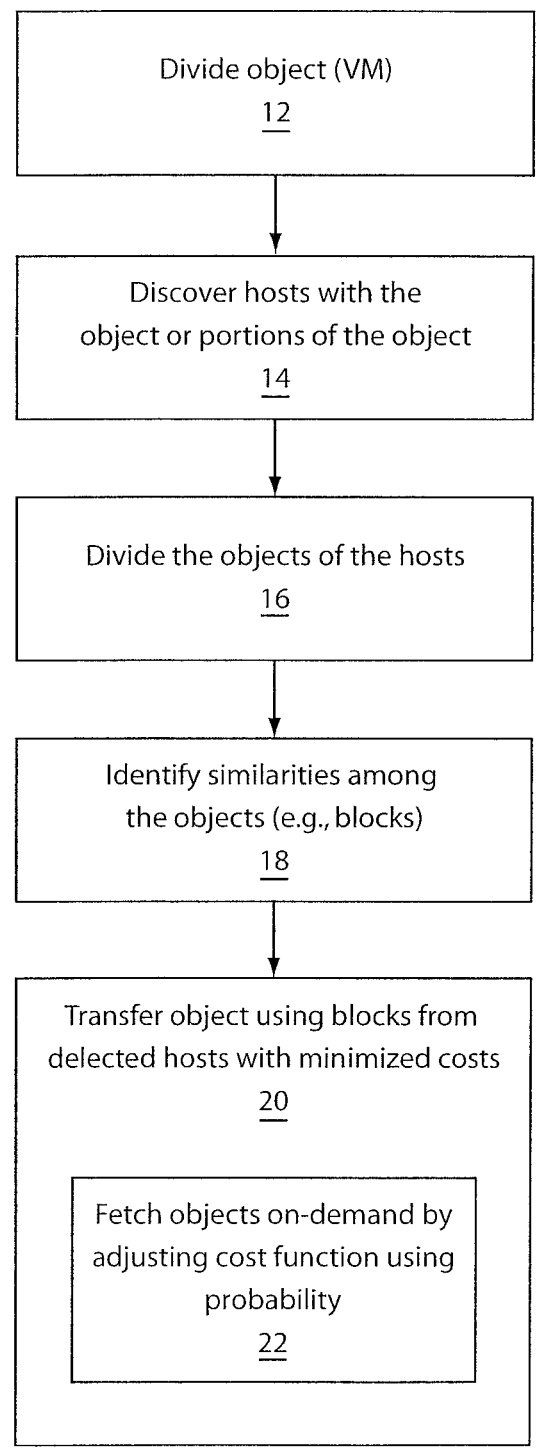
FIG. 1 is a block/flow diagram showing a system/method for transferring objects in a network in accordance with one illustrative embodiment.

The present principles provide for a new way of transferring objects in a network. In one embodiment, the present principles leverage the fact that, in a cloud computing environment, virtual machine (VM) images are very similar to each other. At a file system level, files are stored on one or more blocks of a storage device. It should be noted that the present embodiments are described in terms of storage blocks; however, these embodiments are equally applicable for other storage units such as, e.g., files in a file system. Many of these blocks are the same for different VM images of the same operating system (same or different versions) or even for VM images of different operating systems. Given that in a cloud computing environment most images originate from a small set of seed images, we expect that any VM images generated therefrom are similar.

Based on these facts, a network appliance, in accordance with the present principles, enables instantiation and migration of VMs by utilizing all the running instances of VMs, in addition to the ones that are stored in image library servers. A datacenter will have one or more of the disclosed network appliances with at least one appliance as a network guard for the image library. Other network appliances could be guards to a row of racks or rooms and may be co-located with key routers/switches. While the current embodiments describe the system implementation in terms of network appliances, in other embodiments, the same system and method can be implemented as modules embedded within hypervisors and an image library server, or as modules within datacenter network equipment.

A hypervisor that is going to host a newly instantiated or migrated VM fetches the VM image blocks from any other hypervisor and image library server that happens to have these blocks. However, a protocol between a target hypervisor and source hypervisor/image library is intercepted by the network appliance with the goal of minimizing the network cost (e.g., the bandwidth used).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGs. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a system/method for transferring an object O from a source host A to a target host B is illustratively shown for the transfer of objects from one node to another. The present embodiments are applicable to environments where multiple nodes, interconnected through local, metropolitan and/or wide area networks exist and may include host files of various sizes. These files may have some similarities between them, but they are not necessarily the same. In other words, some sequences of bits appear with more than one file, or even within the same file.

Identifying similar sequences in the file or blocks needs some knowledge about the type of the file as well as its structure. For example, if the file is a VM image then one can use equal sized blocks of some given or fixed size (e.g., 1 Kbyte) to divide or segment the file or object into smaller objects in block 12. If the file is a video file, then one can possibly use the different chapters of the video as the smaller object.

In block 14, hosts populated with objects that have the same or similar objects, including the source and target hosts are discovered. The objects at these hosts are divided into multiple (e.g., smaller) blocks in block 16. Once all files hosted in all nodes are divided into the appropriate smaller objects, the system can compare these objects and identify similarities between the files or objects in block 18. The comparison between objects can be done either directly, bit by bit, or by using a collision resistant hash function (indexing). In the later case, the system needs to compare only the hash values of the objects, rather than the objects themselves. Note also that in some cases it may not be even necessary for the smaller objects to be exactly the same. For example if two video files share the same content within a chapter, but encoded in a different way then the bit by bit comparison or the hash value comparison might fail. In such cases, other comparison functions can be used so that the system can identify if two objects are equivalent, even if the bit by bit comparison shows them as different objects.

Once the system discovers all the available files on the node, through passive monitoring of the network traffic (e.g., using a network appliance or the like as will be described hereinafter), active discovery of the nodes file-system or any other means, it compares their similarities at the object level. Then, the system enables a more efficient transfer of a file F from node N1 (source) to node N2 (target) in block 20 by constructing the object on the target host by fetching each block of the object from those hosts that have the blocks while minimizing a cost function in fetching each block.

More specifically, the system will divide a file F into multiple smaller objects, and then will identify the various nodes, including node N1 and N2, that have the same objects, possibly coming from files different than F. Then, the transfer of file F to node N2 will occur by collecting all the objects of file F from the nodes closest to N2 that have the objects (see the VM-Construction method below). The definition of the closest node can be based on network distance, i.e. number of hops, network latency, or any other network or server related cost metric (e.g., available bandwidth). Note also, that the transfer of the various objects of file F can also happen all at once or on-demand, when node N2 is requesting an object.

The same system/method can be used to identify an optimal location when replicating a file F to a node N1, among a set S1 of nodes which have the potential to host the replicated file. More specifically, given the file F, the system identifies its smaller objects and the location of the nodes that have at least one of these objects, possibly coming from files different than F. This set of nodes can be called S2. Then, given file F and the sets S1 and S2, the system identifies the node N1 from the set S1 that minimizes a cost function in replicating file F on node N1. The cost function can refer to the network distance, network latency, available bandwidth, server load, etc. A method for VM-Placement is preferably employed. For each node N in set S1, the method computes the network cost for replicating file F on that node, by fetching its objects from the most optimal nodes in S2 that have those objects. Then N1 is selected as the node that minimizes the cost function and file F is replicated on N1 by fetching its objects by the most optimal nodes (see, e.g., the VM-Construction method described below).

The method of FIG. 1 can optionally be modified to account for the possibility of the various objects of file F being used on node N1, when the objects are fetched on demand in block 22. In this case, the cost function is adjusted to reflect the probability of an object of file F being used. These probabilities can be computed either based on models that predict the usage of the various objects of a file or based on historical usage patterns of a file.

Figure 2:
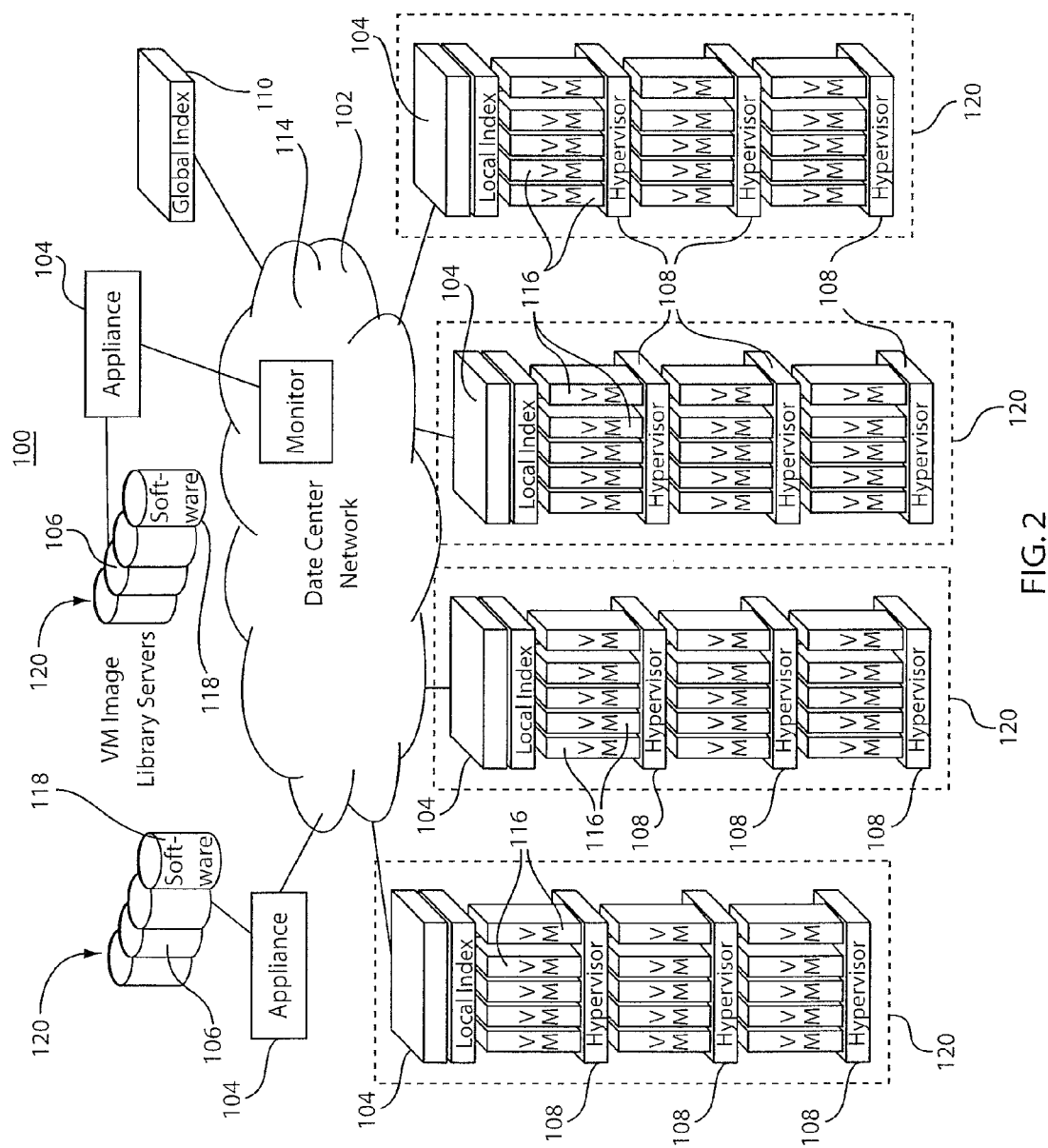
FIG. 2 is a block diagram showing a system including network appliances for assisting virtual machine instantiation and migration in accordance with the present principles.

Referring to FIG. 2, a system 100 is illustratively depicted in accordance with present principles. System 100 illustratively depicts a datacenter network 102 although other networks may be employed. In accordance with particularly useful embodiment, a network appliance(s) 104 is situated next to an image library 106 and/or hypervisors 108, and possibly, controls all traffic back and forth from the image library 106 or hypervisor 108. Other instances of this network appliance 104 may be included in a network path to a row of racks or a room in a data center (102). These network appliances 104 combine information obtained from the image libraries 106, hypervisors 108, and network management systems to orchestrate network-cost aware VM image migration and instantiation.

A network appliance 104 may include an actual machine or a virtual machine that monitors communication lines or paths within a network infrastructure. Since VM images are usually very similar to each other (even across different operating systems, (OSs)), images originate from a small set of seed VMs. This is true in a cloud computing environment. The network appliances 104 preferably are located in front of an image library 106 stored on an image library server 120 or in front of a hypervisor 108 which may be stored and operate on any physical server. The network appliances 104 listen to any management related traffic (using, e.g., the IP addresses of the hypervisors 108 and/or the image library 106). The network appliances 104 build indexes of the various VM blocks and their locations. The network appliances 104 have knowledge of the network topology and cost (e.g., traffic). The network appliances 104 intercept VM transfer related traffic and download VM blocks from closest sources, and assist the VM placement based on network cost.

A global index 110 is created for the network appliance 104 instance (which is preferably located in front of the image library 106). Several local indexers 112 have indices which are created in network appliances 104 that are located at networking locations in the datacenter network 102. A network monitoring system 114 provides network appliances performance and availability data. The image library 106 provides an overlay of network appliances 104 with original VM images 116 and possibly indices that it may calculate to save storage space. VM management software 118 on library servers 120 provides a management interface for VM instantiation and migration. The present principles can employ an existing image library and VM management software 118, however, if the image library 106 and VM management software 118 provide interfaces that can be used, then the network appliances 104 will exploit these application programming interfaces (APIs) to improve the efficiency of VM migration and placement.

A filesharing system in accordance with the present principles works on a file-by-file basis (or object-by-object, etc.). This exploits the fact that a whole VM image, which is essentially a file-system, needs to be transferred from one place to another; it exploits networking protocol splicing and interception which is not found in P2P, Napster, etc. filesharing systems; it exploits the fact that many data centers have standard technologies for storage access—e.g., CEE, iSCSI, Fiber Channel etc. The present embodiments exploit fine-grained network monitoring and topology information. Having a network appliance 104 enables these exploitations and utilizes the features/properties of a data center which are not present in a wide area network (which is the target of P2P filesharing system).

Figure 3:
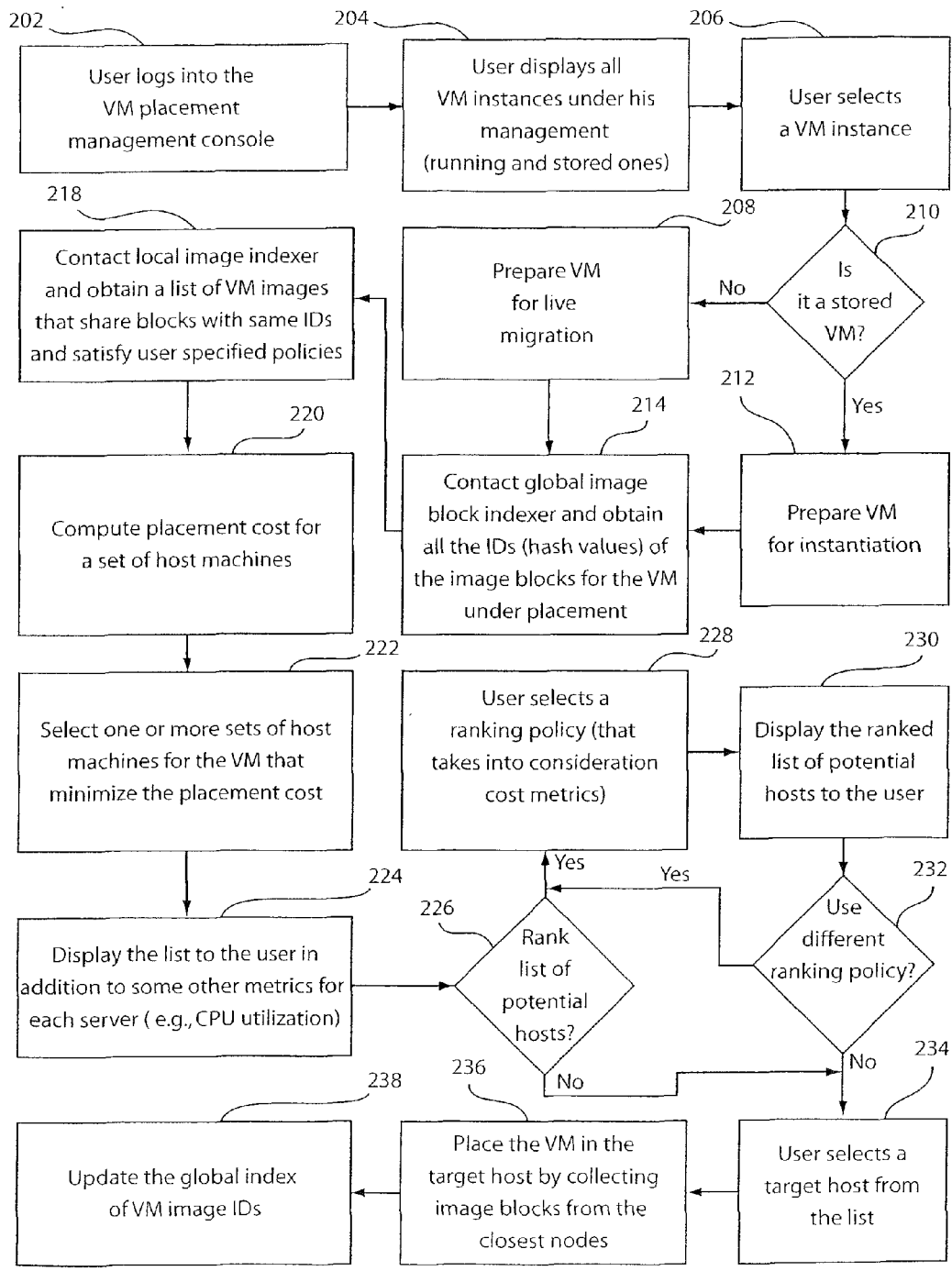
FIG. 3 is a block/flow diagram showing a system/method for assisting virtual machine instantiation and migration in accordance with the present principles.

Referring to FIG. 3, a block/flow diagram shows an exemplary system/method implemented by system 100. The system 100 permits a user (e.g., a cloud administrator) to select a VM for placement or transfer (e.g., instantiation or migration). The user logs into a VM placement management console or other processing element in block 202. The present method may also be employed automatically without user input. All VM instances under the control of the user (including running and stored VMs) are displayed in block 204. In block 206, the user selects one or more VM instances. In block 210, a determination is made as to whether the VM is stored already. If the VM is already stored, the VM is prepared for instantiation in block 212. This may include segmenting a VM into multiple objects. If the VM is not already stored, the VM is prepared for live migration in block 208. In block 214, a global image block indexer is contacted and all IDs (hash values) of the image blocks for the VM to be placed are obtained. In block 218, a local image indexer is contacted to obtain a list of VM images that share blocks with the same IDs and satisfy user or system specified policies (if applicable). This may include identifying hosts that already have at least one of the multiple objects which were segmented portions of the original VM.

In block 220, a placement cost for a set of host machines is computed for target placement of the VM. In block 222, one or more of the host machines are selected that minimize placement cost. In block 224, the list is displayed to the user in addition to other possible metrics, e.g., CPU utilization, resource overhead, etc.). In block 226, a determination is made as to whether the list of potential hosts (candidate list) is to be ranked. If yes, a user selects a ranking policy which considers costs and/or other metrics in block 228. The ranked list of potential hosts is displayed to the user in block 230. In block 232, a determination is made as to whether the ranking policy used is desirable. If the ranking policy is desired, the path returns to block 228; otherwise, the path goes to block 234. If a rank list is not called for in block 226, block 234 is also visited. In block 234, the user selects a target host from the list. In block 236, the VM is placed at the target host by collecting image blocks from closest nodes. In block 238, the global index of VM images IDs is updated.

As described above, a user console may display the list of candidate target hosts based on the networking cost of the VM placement as well as some other metrics (e.g., CPU utilization, memory usage, etc). This list can optionally be a ranked one based on a ranking policy selected by the user. After being displayed the list information, the user picks a target host for the VM placement. This process can be repeated by the user as many times as needed. One technical challenge is in organizing hash values of the image blocks of the VMs and in network-aware placement cost. In the following, we describe how these challenges can be solved using an indexing infrastructure and network topology and performance management infrastructure.

The determination of costs may include considering the segmented portions (if the object has been divided) of an object (e.g. the VM), and for identified hosts that already have at least one of the objects or portions of the objects, selecting hosts that minimize network cost for a given target placement of the VM or object. The VM or object is constructed by fetching the objects from the selected hosts to minimize the cost.

Referring again to FIG. 2, the high-level architecture of system 100 is illustratively shown as a cloud network embodiment. Other network environments are also contemplated. In a cloud computing infrastructure, a number of VM image library servers 120 are included where images are stored, a number of hypervisors 108 that run on top of physical servers (120), and the datacenter network 102 used both for the communication needs of VMs as well as the management needs of the cloud infrastructure (e.g., deployment of VMs). In addition, system 100 includes of a number of image blocks indexers (IBIs) implemented within each network appliance. IBIs are incorporated into local indexers 112 and global indexer 110. IBIs manage a number of images (deployed and stored ones) and keep track of the hash values of the image blocks (by using a collision resistant hash function). A two level hierarchical architecture for the IBIs, where one local IBI (112) is present in each rack and a global IBI (110) is used for the image library servers 120 as well as to collect information from all the local IBIs (112). In general the IBI architecture can be: 1) Centralized: one IBI is used to keep track of all the blocks of the VM imaged, deployed or stored in the datacenter 102. 2) Hierarchical: multiple levels of IBI are deployed and connected with a tree structure. For example, at the first level an IBI is present in each rack, then at the second level an IBI collects information from all IBIs that are connected through a same access switch, then at the second level an IBI collects information from all IBIs connected at the aggregation switches, and so on. 3) Distributed: a number of IBIs are connected in a peer-to-peer fashion. For example, each hypervisor 108 may host one IBI, and all IBIs share the image block information through a distributed hash table.

In accordance with one embodiment, a solution based on the two layer architecture will be described; however, given that similar implementations are possible with any of the above three architectures, other configurations are also contemplated. Each local IBI (112) is responsible for a number of VMs 116. In this two layer architecture, each local IBI (112) is responsible for all the VMs 116 that run on the same rack as the IBI. For all the VMs that an IBI is responsible for, the IBI maintains an index of the hash values of the VMs image blocks. Note that indexes can be maintained for various block sizes, thus creating a hierarchical structure for hash values. Some of these blocks change during the lifetime of the VM while others remain the same. For this reason, IBIs periodically check for any changes with the assistance of the hypervisors 108 that run the VMs. These indexes are then propagated to one layer up, to the global IBI (110), which maintains a consolidated index for all the unique image blocks of VM deployed on hypervisors 108 as well as the image blocks stored in the image library servers 120.

Once a VM image needs to be instantiated or migrated the following two scenarios can be applied (note that they are not mutually exclusive): 1) VM-Construction: The hypervisor 108 that is going to host the newly instantiated or migrated VM has already been selected, through some means that does not take into consideration the distribution of the VM image blocks in the datacenter 102 (e.g. based on hypervisor loads). Then, the indexers are only used to minimize a total number of resources used in the network, during the transfer of the VM image. 2) VM-Placement: The hypervisor 108 that is going to host the newly instantiated or migrated VM is selected by taking into consideration the distribution of the VM image blocks in the datacenter 102 and the network cost to be incurred with the placement of the VM on the candidate hypervisor 108. Note that this selection process can optionally take into consideration other metrics, such as server load. The method used in these two cases for VM placement will now be further described. Below pseudocode is provided for two placement methods. These include VM-Construction and VM-Placement.

The VM-Construction has as its input: VM, Target, Block Index, and Network Cost. The VM identifies the VM to be instantiated or migrated, Block Index provides its location, and Network Cost provides a cost for instantiation or migration, which could be under different circumstances to provide a comparison. The goal of VM-Construction is to fetch VM blocks so that total network cost is minimized. It should be noted that the blocks may include objects portions of objects, files, etc.

The VM-Placement has as its input: VM, Candidate Targets, Block Index, and Network Cost. The VM identifies the VM to be instantiated or migrated. Candidate Targets provides target hosts (hypervisors) for its instantiation or migration, and Network Cost provides a cost for instantiation or migration, which could be used under different circumstances to provide a comparison. The goal of VM-Placement is to find a host hypervisor among candidate targets that minimizes the network cost.

VM-Construction: If the target hypervisor 108 has been already selected, then for each block of the VM image the source hypervisor or image library server that is the closest to the destination hypervisor, which will host the newly instantiated or migrated VM is identified. In the two level architecture, this selection process is executed on the global indexer machine 110 (or any other machine that has access to the global indexer data).

The selection process proceeds as follows: The input to the selection process is the set of hash values H of the image blocks of the VM under placement, and the network cost C between any two pairs of nodes. Network cost between two nodes may correspond to various things: for example it may reflect the number of devices that one has to go through to connect the two nodes. In addition, the cost can be static (based on the network topology) or dynamically changing (based on the link utilization). It is assumed that during the execution of the selection process, the cost matrix is fixed. We obtain network topology and utilization metrics from a network management system 114. Furthermore, we assume that the hash values of the VM image blocks have been computed from blocks of the same size, e.g., blocks of 16 kB. Then, the selection process identifies the set of source nodes (either hypervisors 108 or image library nodes 106) that have at least one common hash value with the VM under placement and which minimize the total network cost incurred by the reconstruction of the VM image on the target hypervisor. Once the set of source nodes are identified, the target hypervisor then is instructed to download the image blocks from the appropriate source nodes. Table 1 shows pseudocode for carrying out a VM-Construction of VM images.

TABLE 1

VM-Construction 1. function VM-Construction(Target t, HashValues H, NetworkCost C){
2.    for each $H_i$ in H {
3.      N ← findNodes ($H_i$);   //find all the nodes that have a block with hash...
4.      s ← findMinCost (t, N, C);//find among nodes N the node s with the minimum....
5.      Ds ← {$D_s$, $H_i$};   //add $H_i$ in the list of blocks to be downloaded...
6.    }
7.    return D;
8. }

VM-Placement: In this case, the network cost is considered for the selection of the target hypervisor 108. More specifically in this scenario the global indexer 110 provides a list of target hypervisors 108 sorted based on the network resources needed for the construction of the VM image on the target hypervisor 108. Again, for each target hypervisor 108, block images are downloaded from the source nodes that lead to the lowest network cost. So the network-dictated placement problem iteratively uses the network-assisted placement method (see, e.g., Table 1). The method takes as input a set of candidate hypervisor targets T, the hash values H of the image blocks under placement and the network cost matrix C. The output is the sorted list T* of the candidate hypervisors 108. Table 2 shows pseudocode for carrying out a VM-Placement of VM images.

TABLE 2

VM-Placement 1. function VM-Placement (Targets T, HashValues H, NetworkCost C){
2.    for each $T_i$ in T {
3.      D ← VM-Construction ($T_i$, H, C); //find the source nodes and their download list....
4.      $P_i$ ← findTotalCost (D);   //find the placement cost of the image for target
5.    }
6.    I ← sort (P);   //get the index I of the sorted placement cost...
7.    return T(I);   //return the sorted list of targets
8. }

The above sorted list of candidate target hypervisors can be used in the following ways: 1) Select the hypervisor at the top of the list, i.e., the one that yields the minimum network cost among all candidate hypervisors, as the target hypervisor for the instantiation or the migration of the VM. 2) Select among the top "X" hypervisors in the list, the one that minimizes another cost, e.g., the hypervisors CPU, memory or disk utilization (or even a composite cost based on multiple other metrics). 3) Select among the hypervisors that have at most X % higher cost compared to the cost of the hypervisor at the top of the list, the one that minimizes another cost, e.g., the hypervisor's CPU, memory or disk utilization (or even a composite cost).

After either VM-Construction or VM-Placement method is called, the virtual appliance closest to the target hypervisor, on which the VM is going to be instantiated or migrated to, becomes responsible for optimally populating the various image blocks on the target hypervisor. More specifically, it uses the output of the VM-Construction method and fetches the needed image blocks from the closest hosts, i.e. the VMs and the image library servers that have those blocks. Fetching of those blocks can happen either all in once or on-demand, by intercepting the image block requests of the target hypervisor.

Having described preferred embodiments of network appliance and method for assisting virtual machine instantiation and migration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transferring an object O from a source host A to a target host B, comprising:
   discovering hosts populated with objects divided into blocks, including at least one of the source host and the target host;
   identifying hosts that have at least one of multiple blocks of the object O; and
   performing a piecewise reconstruction of the blocks of the object O from identified hosts, the identified hosts being selected to minimize a cost of reconstruction of the blocks of the object O to the target host.

2. The method as recited in claim 1, wherein the identifying hosts includes identifying the target host B, from a set S of candidate hosts, so that a cost for transferring object O from host A to host B is smaller than a cost for transferring object O from host A to any of the hosts in S excluding B.

3. The method as recited in claim 1, wherein the cost of reconstruction reflects at least one of an amount of network resources, an amount of time and an amount server processing resources used in transferring the object O.

4. The method as recited in claim 1, wherein the blocks of object O are requested on-demand by the target host B and a cost function determines a probability of a given block being requested by the target host B.

5. The method as recited in claim 1, wherein the discovering hosts populated with objects includes providing a network appliance in a location for listening to management information traffic.

6. The method as recited in claim 1, wherein the object O includes a virtual machine (VM) image.

7. A system for virtual machine (VM) transfer, comprising:
   one or more network appliances placed in a network infrastructure, the one or more network appliances configured to:
      discover hosts populated with objects divided into blocks, including at least one of a source host and a target host;
      identify hosts that have at least one of multiple blocks of an object O; and
      perform a piecewise reconstruction of the blocks of object O from identified hosts, the identified hosts being selected to minimize a cost of reconstruction of the blocks of the object O to the target host.

8. The system as recited in claim 7, wherein the network infrastructure includes a VM library server and the one or more network appliances are placed at or near at least one of a VM library server and a hypervisor to listen for VM management related traffic and to intercept VM placement related traffic.

9. The system as recited in claim 7, further comprising a global indexer configured in memory to store image identifiers for VM objects collected by the one or more network appliances.

10. The system as recited in claim 9, wherein the global indexer generates an index of VM objects by building indexes of VM blocks and their locations using hash values from the global indexer.

11. The system as recited in claim 7, wherein one or more closest sources are determined based upon a network cost, wherein the network cost is determined based on hosts that minimize network cost for a given target placement of the VM.

12. The system as recited in claim 7, wherein the one or more the network appliances are placed in front of one of an image library and a hypervisor to intercept management information traffic.

13. The system as recited in claim 12, wherein the hypervisor is selected from a plurality of hypervisors to minimize a network cost.

14. A computer-readable storage medium comprising a computer readable program, wherein the computer readable program when executed on a computer causes the computer to transfer an object O from a source host A to a target host B, the transferring comprising of:
   discovering hosts populated with objects divided into blocks, including at least one of the source host and the target host;
   identifying hosts that have at least one of multiple blocks of an object O; and
   performing a piecewise reconstruction of the blocks of object O from identified hosts, the identified hosts being selected to minimize a cost of reconstruction of the blocks of the object O to the target host.

15. The computer-readable storage medium as recited in claim 14, wherein the identifying hosts includes identifying the target host B, from a set S of candidate hosts, so that a cost for transferring object O from host A to host B is smaller than a cost for transferring object O from host A to any of the hosts in S excluding B.

16. The computer-readable storage medium as recited in claim 14, wherein the cost of reconstruction reflects at least one of an amount of network resources, an amount of time and an amount server processing resources used in transferring the object O.

17. The computer-readable storage medium as recited in claim 14, wherein the blocks of object O are requested on-demand by the target host B and a cost function determines a probability of a given block being requested by the target host B.

18. The computer-readable storage medium as recited in claim 14, wherein the discovering hosts populated with objects includes providing a network appliance in a location for listening to management information traffic.

19. The computer-readable storage medium as recited in claim 14, wherein the object O includes a virtual machine (VM) image.

* * * * *